United States Patent [19]

Eggerton et al.

[11] Patent Number: 5,144,977

[45] Date of Patent: Sep. 8, 1992

[54] FLUID VALVE WITH ACTUATION SENSOR

[75] Inventors: Don W. Eggerton, Pineville; David J. Scallan, Bentley, both of La.

[73] Assignee: Dresser Industries, Inc., Dallas, Tex.

[21] Appl. No.: 717,912

[22] Filed: Jun. 20, 1991

[51] Int. Cl.$^5$ .................................. F16K 37/00
[52] U.S. Cl. .................................. 137/554; 200/81.9 M
[58] Field of Search .............. 137/554, 1; 200/81.9 M

[56] References Cited

U.S. PATENT DOCUMENTS

| | | | |
|---|---|---|---|
| 2,892,051 | 6/1959 | Moore | 200/81.9 M |
| 3,789,875 | 2/1974 | McGee | 137/554 X |
| 3,859,619 | 1/1975 | Ishihara et al. | 137/554 |
| 3,896,280 | 7/1975 | Blake | 200/81.9 M |
| 4,213,021 | 7/1980 | Alexander | 200/81.9 M |
| 4,340,086 | 7/1982 | Hemm et al. | 137/554 |
| 4,696,325 | 9/1987 | Magee | 137/554 X |
| 4,967,792 | 11/1990 | Magee | 137/554 X |
| 5,031,660 | 7/1991 | Magee | 137/554 |

*Primary Examiner*—John Rivell
*Attorney, Agent, or Firm*—Hubbard, Thurman, Tucker and Harris

[57] ABSTRACT

Method and apparatus for remotely detecting when a safety relief valve is initially opened includes a permanent field fixedly associated with the closure member and a magnetic proximity switch mounted on the housing so that initial movement of the magnetic field causes the magnetic proximity switch to close, indicating that the valve has opened. Adjustment means are provided to calibrate the position of the sensor switch so that initial movement of the closure member from the seat of less than 0.04 inches can be detected without interfering with the operation of the valve.

15 Claims, 2 Drawing Sheets

FLUID VALVE WITH ACTUATION SENSOR

FIELD OF THE INVENTION

This invention relates generally to fluid valves, and more particularly relates to method and apparatus for determining when a safety relief valve or the like has opened.

BACKGROUND OF THE INVENTION

Modern petroleum refineries, petrochemical plants, and other facilities, particularly those which use steam boilers are largely automated and operated from a remotely located control center for reasons of both safety and economy. Inherent in this operation is the need to remotely determine when valves have been actuated, and particularly when safety relief valves have been actuated by an unsafe pressure condition. Such information is communicated to the control center by standardized low voltage systems which utilize a transmitter at the remote location.

The first movement of the closure member as the safety valve opens has previously been sensed by either mechanical contact or mercury contact switches mechanically coupled to the moving part of the valve. These devices have been used for many years but have not been wholly satisfactory because they require excessive movement of the valve before opening, thus sometimes failing to detect a partial opening, are intricate in structure in order to achieve the necessary adjustability and sensitivity, have required excessive force to operate which interferes with the normal operation of the valve, and have been subject to damage due to the excessive vibrations inherent in most applications of this type of equipment.

SUMMARY OF THE INVENTION

The present invention is concerned with an improved method for sensing when a valve has opened which comprises attaching a permanent magnet to the moving closure member to establish a permanent magnetic field which moves with the movable closure member as it initially moves from a closed position to an open position. The magnetic field is oriented such that a graduation in the field strength extends in the direction of movement. Movement of the field is detected by placing a magnetic proximity switch in the magnetic field so that the proximity switch is subjected to a changing field strength which causes the switch to change conditions, either from open to closed, or closed to open. This change in condition is communicated to a remote location as an indication that the valve has opened.

The present invention is also concerned with an improved valve for carrying out the method of the invention which includes a valve housing having a valve seat and a closure member adapted to mate with the valve seat to seal the fluid passageway through the housing. A permanent magnet is attached to the closure member and establishes a permanent magnetic field which moves with the closure member as the body moves from the closed to the open position. A proximity electrical switch means is positioned in the fringe of the permanent magnetic field and is adapted to quickly transition from an open to a closed condition in response to a slight change in the magnetic field strength in which the switch is positioned.

In accordance with an important aspect of the invention, the relative positions of the magnet and the proximity switch can be adjusted so that the switch is positioned just outside magnetic field level which is the threshold switching level of the magnetic field. As a result, extremely small initial movement of the closure member, as little as 0.04" results in a change of condition of the electrical switch means from open to closed.

In one embodiment of the invention, the closure member reciprocates along a linear path within the housing and includes a stem which extends through the housing. A permanent magnet is attached to the stem and is enclosed within a non-magnetizable closure attached to the housing. The magnet means is preferably an annular structure disposed concentrically around the axis of the valve stem to produce a magnetic field which is concentrated along the axis of the stem and flares out around the end concentric to the axis of reciprocation of the spindle. The proximity switch means is disposed beyond the end of the stem and magnet in the direction of movement of the stem as the valve opens, and at a point just outside the threshold magnetic field level of the switch so that the initial movement of the closure member and magnetic field will cause the switch to change condition. The spacing between the magnet means and the proximity sensor switches can be mechanically adjusted to facilitate calibrating the system such that initial minimal movement of the closure member from the valve seat results in the proximity sensor switch changing conditions from open to closed.

In accordance with another aspect of the invention, the magnet means is formed by a plurality of annular ceramic magnets disposed concentrically around the valve stem and clamped between plate means which are axially adjustable on the valve stem and include resilient washers for cushioning the magnets from shock.

In accordance with another important aspect of the invention, the annular magnets are mounted in a cup which is attached to the valve stem in such a manner as to permit axial adjustment, with the center of the magnets open. A magnetizable core rod is mounted coaxial with the valve stem and is positioned such that the end of the core rod is outside the magnets and within the fringing zone of the magnetic field when the valve is closed. The core rod is mounted in a non-magnetic closure attached to the valve housing so as to be axially adjustable to position the end of the rod at the appropriate location within the magnetic field. The proximity switch is mounted to sense the magnetic field in the core rod. The positioning of the core rod is such as to provide a large change in magnetic field strength with minimum movement of the field to provide maximum sensitivity to detect initial movement of the valve.

DESCRIPTION OF THE DRAWINGS

These and other objects and advantages of the invention are achieved by preferred embodiments of the invention illustrated by the following drawings in which.

Figure 1:
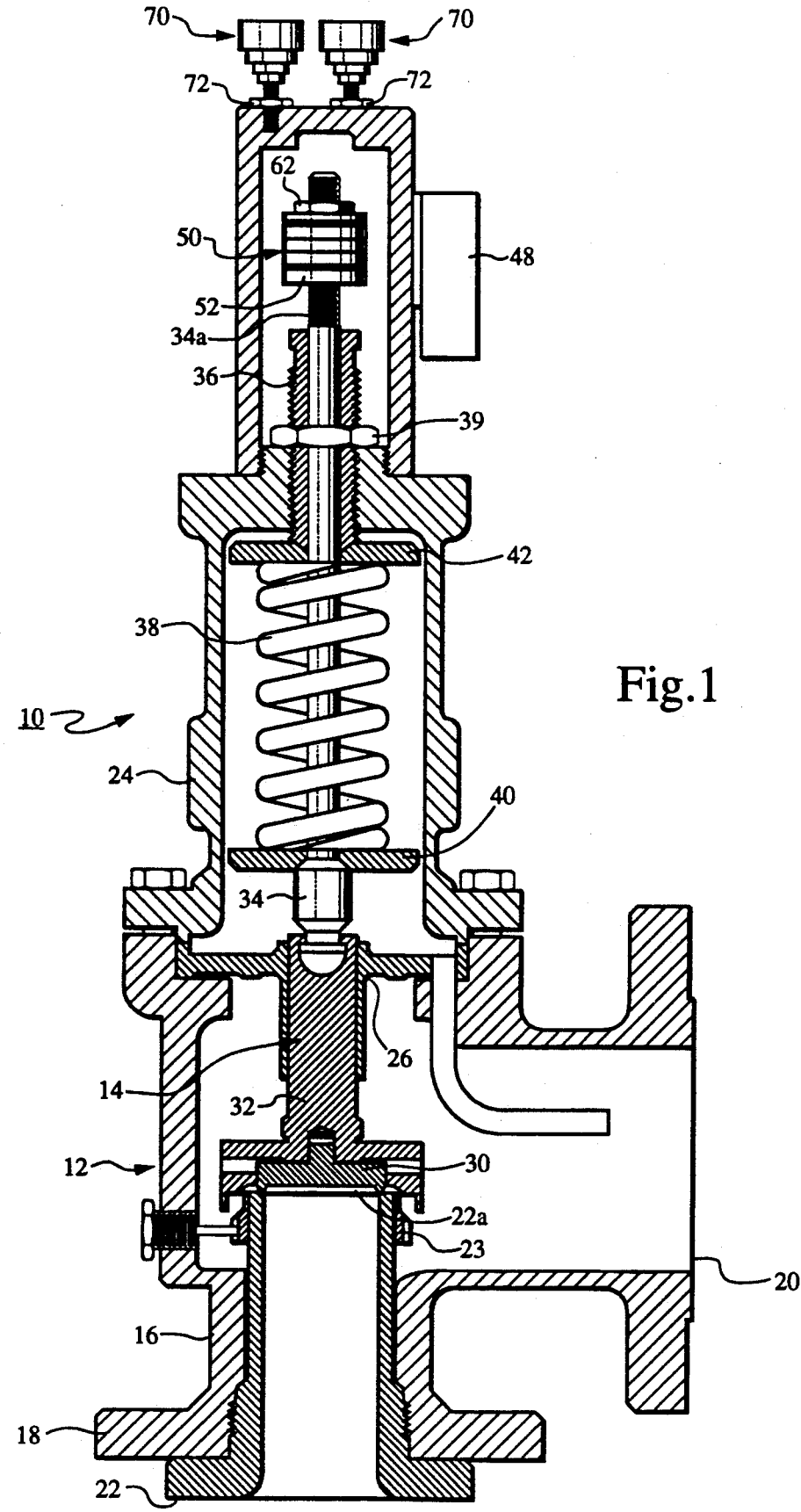
FIG. 1 is a sectional view through a safety relief valve constructed in accordance with the present invention.

Referring now to the drawings, a valve constructed in accordance with the present invention is indicated generally by the reference numeral 10. The valve 10 includes a valve housing indicated generally by the reference numeral 12 and a closure member indicated generally by the reference numeral 14.

In general, the valve housing is indicated as being those components which are integrally interconnected and normally stationary, and which contains fluid as it passes through the valve. Thus, the housing includes the base 16 having bolt flanges 18 and 20 adapted to be connected into a fluid conduit. A nozzle is positioned in the base 16 and forms a valve seat 22a. A conventional adjusting mechanism 23 is provided for the valve seat mechanism 22a. A bonnet 24 is bolted to the base 16 and clamps a guide 26 in position.

The closure member 14 is generally comprised of those components which reciprocate relative to the housing 12 between closed and open positions. Thus, the closure member 14 includes a valve disc 30 which is adapted to mate with and sealingly engage the valve seat 22a, a valve disc holder 32 which is reciprocally received in a guide 26. A spindle or valve stem 34 is received in a cup in the upper end of the disc holder 32 and extends through an adjusting screw 36 threaded into a bore in the upper end of the bonnet 24. A spiral spring 38 is disposed around the stem 34 and is compressed between lower spring washer 40 at the lower end which engages the spindle 34 and the second upper washer 42 which engages the adjusting screw 36. A lock nut 39 secures the adjusting screw 36 in a selected axial position relative to the bonnet 24.

The portion of the valve 10 thus far described is a standard valve in commercial use. Various components can be attached to the upper end of bonnet 24 to operate the stem 34, such as, for example, lever arrangements to open the safety valve, closure caps, or gags to limit the extent of upward movement of the valve stem. The basic operation of the valve is as a safety release valve in that the spring 38 biases the valve member 14 downwardly to seat the disc 30 against the valve seat 22a. When the pressure within the nozzle 22 exceeds the pressure on the downstream side of the valve disc 30 by an amount sufficient to overcome the force of the spring 38, the valve is opened to vent the pressure. The adjusting screw 36 provides a means by which the pop-off pressure of the valve can be adjusted or calibrated. The lock nut 39 is then tightened down to secure the adjusting screw 36 at the selected position.

In order to detect the slightest initial movement of the closure member 14 from the valve seat, typically as little as 0.04", a permanent magnet means 50 is mounted on top of the portion of the valve stem 34 extending through the bonnet 24 and adjusting screw 36 of the housing. This permanent magnet means 50 includes a lower adjusting nut 52 threadedly positioned on the upper end of the valve stem 34a. A resilient, shock absorbing washer 54 is placed on the nut 52, and a plurality of permanent magnets 56 are positioned around the stem and rest on the resilient washer 54. An upper resilient washer 58 is positioned above the magnets and a metal washer 60 completes the stack. A lock nut 62 is threaded onto the valve stem 34a to secure the magnet means 50 in place. The spindle 34, adjusting screw 36, adjusting nut 52, washer 60 and lock nut 62 are all preferably fabricated of stainless steel or other non-magnetic material, although the upper end of the stem 34 may be formed of a magnetic core material if it is desired to focus and strengthen the magnetic field.

A stainless steel cap 64 is threaded onto a boss on the upper end of the bonnet 24 to enclose the upper end of the stem and magnet means 50. Three identical magnetic proximity sensors 70 (only two being illustrated) are threaded into bores spaced at 120° C. around the upper end of the cap 64 and are secured in place by lock nuts 72. The sensors 70 are preferably commercially available proximity switches. Each sensor includes a normally open switch which is closed when the magnetic field in which the sensor is positioned increases above a threshold value, which in the present case is occasioned by movement of the magnetic field produced by the permanent magnet means 50 toward the sensors. The switches of the three sensors 70 are connected in parallel with the input to a standard terminal box which is in communication with the remote control center by way of a conventional communication network so that if any one of the three switches closes, an indication that the valve has opened will be sent.

As mentioned, the proximity sensor switches 70 transition from an open condition to a closed condition when the magnitude of the magnetic field in which the sensors are located transition through a threshold value. The magnetic force lines produced by the permanent magnet means 50 are concentrated along the axis of the annular magnet and then form a toroidal loop around the outside of the magnets as indicated generally by the dotted lines 74. Thus, if one of the dotted lines represented the threshold value at which the sensor switches changes condition, it will be seen that by adjusting the relative axial positions of the permanent magnet means and the sensor switches, the threshold value may be positioned so that a minute initial movement of the closure member results in the threshold value of the magnetic field moving to actuate the sensor switch.

Thus, it will be appreciated by those skilled in the art that the system for sensing the opening of the valve in accordance with the present invention is capable of detecting a very slight initial movement of the closure member as it moves from a sealed or closed position on the valve seat toward an open position. Further, the system is very simple and economical of construction, and provides a simple on/off electrical signal to the terminal 48 for communication to the control room. The system can be easily calibrated to detect the initial movement, by gross adjustment of the position of the permanent magnet means 50 on the stem 34, by rotating the lower nut 52 to the desired position and then locking the stack in place with the upper lock nut 62. Similarly, the position of each of the three sensors 70 can be adjusted individually relative to the permanent magnet means 50, and thus one relative to the other, by the threaded connection between the sensors 70 and the cap 64, and then tightening the respective lock nuts 72. The use of a plurality of individual ceramic magnets 56, of the type widely produced for use in acoustic loud speakers, for example, provides a very economical assembly of adequate magnetic strength. The assembly, together with the resilient cushioning washer 54 and 58, protects the fragile ceramic magnets from the high shock loads resulting from the operation of the valve, and from other hydraulic shock impulses typically found in applications for this type valve.

Figure 3:
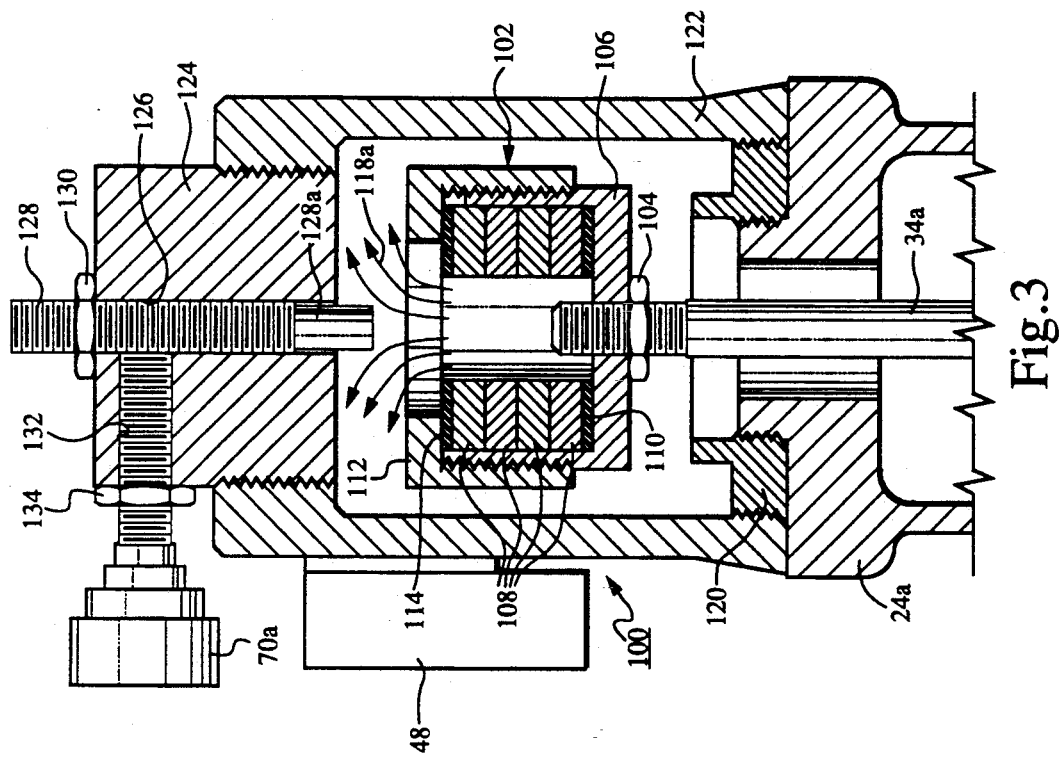
FIG. 3 is a sectional view of the upper portion of a valve which illustrates an alternative embodiment of the invention.

An alternative embodiment of a system for detecting a valve opening in accordance with the present invention is indicated generally by the reference numeral 100 in FIG. 3. The system 100 may be used with the same valve housing and closure member disclosed in FIG. 1. The bonnet 24a corresponds to the bonnet 24 of the valve of FIG. 1, and the stainless steel valve stem 34a corresponds to the valve stem 34. A permanent magnet assembly 102 is adjustably mounted at the upper end of the valve stem 34a. The permanent magnet assembly 102 includes a lock nut 104 and magnet cup holder 106 which are both threaded onto the upper end of the valve stem 34a. A plurality of annular ceramic magnets 108 are placed on a resilient cushioning washer 110 in the cup 106. A flanged locking sleeve 112 is threaded on the outside of the cylindrical portion of the cup 106 and the flange engages an upper resilient washer 114 to secure the stack of magnets in the cup 106 in a cushioned manner to prevent damage to the magnets due to vibratory shock loads resulting from operation of the valve or other sources. It is perferred that all components for mounting the magnets on the stem be fabricated from non-magnetic material such as austenitic stainless steel.

An adapter nut 120 is threaded onto the boss of the bonnet 24a, and a non-magnetic, typically stainless steel cap 122 is threaded onto the outer periphery of the adapter nut 120. A stainless steel plug 124 is threaded into the upper end of the cylindrical cap 122 and includes a threaded bore 126 which is aligned coaxially with the valve stem 34a. A magnetizable magnetic core rod 128 is threaded into the bore 126 until the lower end 128a is positioned above the permanent magnet 102 so as to be located in the variable strength or fringe area of the magnetic field as will presently be described in greater detail. A lock nut 130 secures the core rod 128 in its finally adjusted position.

Figure 2:
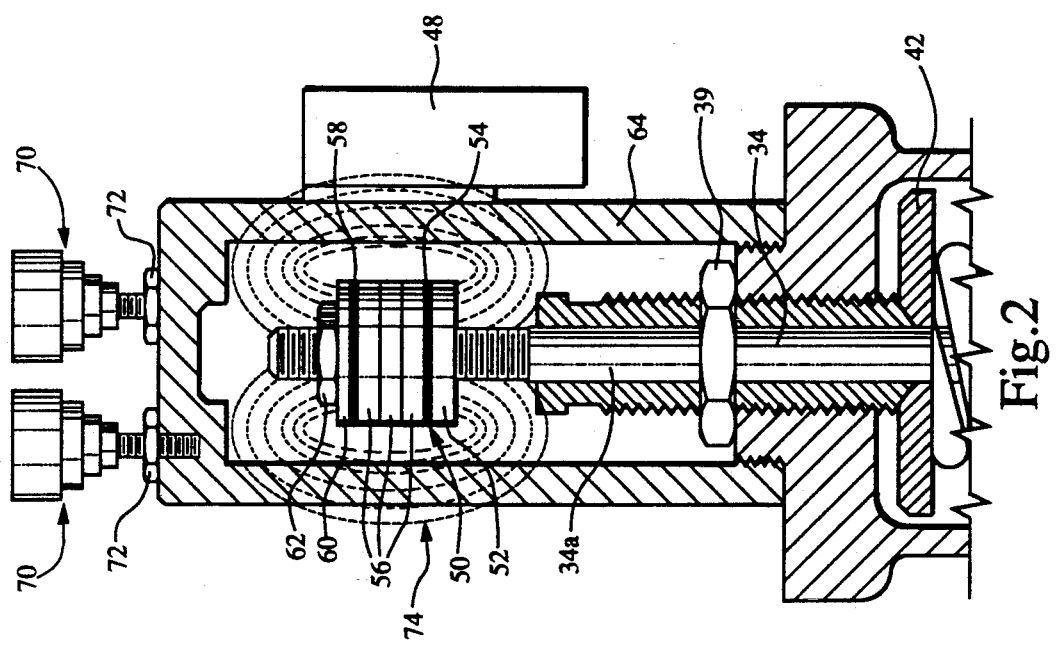
FIG. 2 is an enlarged view of the upper portion of the valve in illustrated in FIG. 1.

A proximity switch sensor 70a, which may be identical to previously described sensors 70 in connection with FIGS. 1 and 2, is threaded into a threaded bore 132 in the plug 124. The end of the attachment rod of the sensor 70a is disposed in close proximity to the core rod 128 so as to detect the magnetic field in the core rod. Stainless steel lock nut 134 is used to secure the proximity switch in place in the bore 132.

The operation of the system 100 of FIG. 3 is similar to the operation described in connection with the apparatus of FIGS. 1 and 2 in that the initial movement of the closure member results in the switch of proximity sensor 70a changing from the open condition to the closed condition, which condition is then transmitted to the control room and used as an indication that the valve has been operated. This is achieved by the fact that the lower end of the core rod 128a is positioned above the permanent magnet means 108 within the fringing area of the magnetic field. The magnet lines of flux are transmitted by the magnetizable core rod 128 to the proximity switch which detects the magnetic field strength within the core rod.

The adjustable core rod 128 provides a means for easily calibrating the system after assembly, even when installed in the field. Thus, when the closure member is in its closed position against the valve seat and the proximity sensor 70 is connected in a circuit, the lock nut 130 can be loosened and the rod 128 screwed downwardly until the proximity switch closes. The rod 128 can then be backed out until the proximity switch again opens at which position the rod 128 is locked in place with the nut 130. In this case, when the closure member and valve stem 34a move a distance corresponding to the distance the rod was backed out, the switch will close and indicate that the valve has been actuated. Closure member movement less than 0.04 can be detected using this method. However, it will be noted that the valve stem is terminated near the bottom of the stack of magnets so that the magnets, and thus the closure member, is free to move upwardly to a full, unimpeded, open position.

The arrangement illustrated in FIG. 3 is particularly sensitive because the magnetic lines of force are highly concentrated along the axis of the permanent magnets and within the open magnets. As soon as the magnetic flux lines exit the top of the magnets, they begin to flare out as they move across the top of the magnets and return down the outside of the magnets to re-enter at the lower end in a toroidal configuration. Thus, the end of the core rod 128a is disposed in the region where the magnetic field is greatest, but where it also has the greatest change in strength per axial distance. It will be noted that the center of the annular magnet is left open so that the core rod can be placed in the fringe region of greatest strength, yet the closure member can move to a full open position because the magnets are free to move upwardly around the core rod. As a result, a very slight movement in the magnet assembly results in a substantial change in the magnetic field strength applied to the end of the cord rod 128a, which is then transmitted to the proximity sensor 70a.

Although perferred embodiments of the invention have been described in detail, it is to be understood that various changes, substitutions and alterations can be made therein without departing from the spirt and scope of the invention as defined by the appended claims.

What is claimed is:

1. A valve comprising:
    valve housing including a valve seat,
    a closure member movable within the valve housing between a closed position in sealing engagement with the valve seat and an open position,
    permanent magnet means connected to the closure member and movable therewith, the magnet means establishing a permanent magnetic field which moves with the magnet means,
    magnetic detection means coupled to the valve housing the magnetic detection means including switch means having an open switch condition and a closed switch condition and transitioning from one condition to the other in response to a transition through a threshold value of the strength of the magnetic field in which the switch means is disposed,
    the magnetic detection means being located at a point within the magnetic field of the magnet means such that the initial movement of the closure member from the seat will result in a change of the condition of the switch means whereby the change and condition can be remotely detected, and
    means for selectively adjusting the position of at least a portion of the magnetic detection means axially relative to the magnet means to cause the change of condition of the switch means to occur during the initial movement of the closure member from the seat.

2. The valve of claim 1 wherein
    the closure member is reciprocally movable along a linear axis between the sealed and open position and is biased to the sealed position with a predetermined force to provide a safety valve, and includes a valve stem disposed on the axis and extending through a wall of the closure member,
    the magnet means is mounted on the valve stem and reciprocable therewith, and the magnetic detection means is mounted on nonmagnetic mounting means which enclosed the valve stem and magnet means and disposed such that the magnet means moves toward the switch means as the closure member moves from the valve seat.

3. The valve of claim 1 wherein the magnetic detection means further includes magnetizable rod means magnetically coupled to the switch means, the magnetizable rod means being located at a point within the magnetic field of the magnet means such that the initial movement of the closure member from the seat will result in a change in condition of proximity detector means, and wherein the means for selectively adjusting the position of the proximity detector includes means for selectively adjusting the position of the magnetizable rod means axially relative to the magnet means.

4. The valve of claim 3 wherein the magnetizable rod means includes a second magnetizable rod mounted through the valve housing axially relative to the magnet means, and wherein the means for selectively adjusting the position of the magnetic detection means includes means for selectively adjusting the position of the magnetizable rod.

5. The valve of claim 4 wherein the magnetizable rod means includes a second magnetizable rod magnetically coupling the first magnetizable rod to the switch means.

6. The valve of claim 1 further comprising a second magnetic detection means coupled to the valve housing, the second magnetic detection means being located at a point within the magnetic field of the magnet means such that the initial movement of the closure member from the seat will result in a change of the condition of the proximity detector means, whereby the change in condition of the first magnetic detection means and the second magnetic detection means are each separately remotely detected to independently indicate intial movement of the closure member.

7. The fluid valve comprising:
a valve housing forming a valve seat;
a closure member for mating with the valve seat and forming a fluid seal, the closure member including a valve stem which reciprocates linearly away from the valve seat as the valve opens,
permanent magnet means attached to the valve stem and forming a permanent magnetic field having a region of variable magnetic strength in a direction parallel to the axis of the valve stem;
magnetizable rod means adjustably mounted on the valve housing and extending into the region of variable magnetic strength, and
magnetic proximity sensor means including switch means for detecting the level of magnetic field strength in the rod means and closing the switch to indicate that the closure member has parted from the valve seat and the valve has opened.

8. The fluid valve of claim 7 wherein the magnet means is disposed concentrically around the axis to the valve stem and has an open center to accommodate the rod means and the rod means is mounted substantially coaxial with the valve stem with the end of the rod means positioned outside the magnet means when the valve is closed, whereby the rod means may be positioned near the magnet means yet the closure member is permitted to move to a full open position in which the magnet means is disposed around the end of the rod means.

9. a valve comprising:
valve housing including a valve seat,
a closure member movable within the valve housing between a closed position in sealing engagement with the valve seat and an open position,
permanent magnet means connected to the closure member and movable therewith, the magnet means establishing a permanent magnetic field which moves with the magnet means and including annular ceramic magnets disposed around the stem so as to establish a magnetic field, the poles of which are aligned generally with the axis of reciprocation, the ceramic magnets mounted between resilient cushioning means to reduce vibration damage,
proximity detector means coupled to the valve housing having an open switch condition and a closed switch condition and transitioning from one condition to the other in response to a transition through a threshold valve of the strength of the magnetic field in which the switch means is diposed, the proximity detector means being located at a point within the magnetic field of the magnet means such that initial movement of the closure member from the seat will result in a change of the condition of the proximity detector means whereby the change in condition can be remotely detected.

10. The valve of claim 9 wherein the valve stem is threaded and the magnets are mounted between a first plate on one end of the magnet means which is threaded onto the stem, a second plate slidable on the stem disposed on the other end of the magnet means, and a lock nut for moving the second plate toward the first plate and locking the two plates in place, and the resilient cushioning means are disposed between the plates and the magnet means.

11. A valve comprising:
valve housing including a valve seat,
a closure member movable within the valve housing between a closed position and sealing engagement with the valve seat in an open position,
permanent magnet means connected to the closure member and movable therewith, the magnet means establishing a permanent magnetic field which moves with the magnet means and including annular ceramic magnets disposed around the stem so as to establish a magnet field, the poles of which are aligned generally with the axis of reciprocation,
proximity detector means coupled to the valve housing having an open switch condition and a closed switch condition and transitioning from one condition to the other in response to a transition through a threshold value of the strength of the magnetic field in which the switch means is disposed, the proximity detector means being located at a point within the magnetic field of the magnet means such that initial movement of the closure member from the seat will result in a change of the condition of the proximity detector means whereby the change in condition can be remotely detected.

12. A method of sensing the opening of the valve which comprises the steps of:
attaching a magnet to the valve stem of a closure member which moves away from a valve seat when the valve opens to establish a magnetic field which moves the closure member, the magnetic field having a region of variable strength;
positioning a magnetic proximity sensor in the region of variable field strength at a position where the magnetic field strength transitions to a threshold value as a result of an initial movement of the closure member from the valve seat, the magnetic proximity sensor including a switch contact having open and closed conditions, the switch contact transitioning from one condition to the other condition when the magnetic field transitions through the threshold value as a result of movement of the magnetic field; and detecting the changing and the condition of the switch as an indication the valve is opened.

13. The method of claim 12 further including the step of initially adjusting the axially relative position of the magnet and the magnetic proximity sensor after the valve is installed such that the switch contact transitions for said one condition to the other condition upon the initial movement of the closure member.

14. The method of claim 12 wherein the magnetic proximity sensor includes a magnetic conductor, wherein the step of positioning a magnetic proximity sensor in the region of variable field strength includes the step of positioning the magnetic conductor in the region of variable field strength such that it transmits to the switch means the change in the magnetic field strength through the threshold value upon initial movement of the valve closure member.

15. The method of claim 14 further including the step of initially adjusting the axially relative position of the magnet and the magnetic proximity sensor after the valve is installed such that the switch contact transitions for said one condition to the other condition upon the initial movement of the closure member, wherein the step of adjusting the relative positions of the magnet and the magnetic proximity sensor includes the step of adjusting the position of the magnetic conductor means within the magnetic field generated by the magnet.

* * * * *

UNITED STATES PATENT AND TRADEMARK OFFICE
CERTIFICATE OF CORRECTION

PATENT NO.   : 5,144,977

DATED        : September 8, 1992

INVENTOR(S)  : Don W. Eggerton, et al.

It is certified that error appears in the above-identified patent and that said Letters Patent is hereby corrected as shown below:

In the Abstract

At lines 2-3, after "permanent", insert -- magnetic --.

Column 3, line 9, after "nozzle", insert -- 22 --.

Column 3, line 28, "36 in" should be -- 36. A lock nut 39 secures the adjusting screw 36 in --.

Column 5, line 14, "perferred" should be -- preferred --.

Column 6, line 27, "spirt" should be -- spirit --.

Column 7, line 2, "enclosed" should be -- encloses --.

Column 7, line 37, "intial" should be -- initial --.

Column 7, line 68, "a" should be -- The --.

Column 8, line 18, "valve" should be -- value --.

UNITED STATES PATENT AND TRADEMARK OFFICE
CERTIFICATE OF CORRECTION

PATENT NO. : 5,144,977

DATED : September 8, 1992

INVENTOR(S) : Don W. Eggerton, et al.

It is certified that error appears in the above-identified patent and that said Letters Patent is hereby corrected as shown below:

Column 8, line 45, "magnet" should read --magnetic--

Signed and Sealed this

Ninth Day of November, 1993

*Attest:*

BRUCE LEHMAN

*Attesting Officer*  *Commissioner of Patents and Trademarks*